Patented Jan. 9, 1945

2,366,854

UNITED STATES PATENT OFFICE 2,366,854

ELECTRIC IMPULSE SIGNALING SYSTEM

Bertram Morton Hadfield, Harrow Weald, England, assignor to Automatic Electric Laboratories Inc., a corporation of Delaware Application December 30, 1942, Serial No. 470,659
In Great Britain February 28, 1942

9 Claims. (Cl. 179—16)

The present invention has reference to the improvement of the signaling methods and circuits used in automatic telephone and the like systems whereby selection of the desired apparatus is obtained by means of "make" and "break" impulses of known type. The invention relates more specifically to the present system known as "loop" signaling and one of the objects is the provision of signaling methods and circuits in such a manner as to permit the use of the normal supervisory arrangements. The terms "near" and "distant" as used herein refer respectively to the positions of the controlling contact and the controlled relay or other device with respect to the transmission medium, such as a cable pair.

According to one feature of the invention, in a signaling system, impulses are transmitted to a distant controlled relay through which battery is fed to a line or cable over a loop circuit by alternately closing the circuit at the near end of the line or cable and inserting a counter-electromotive force in the circuit to cause the current through the controlling relay to revert to its value prior to the closure of the contact and so cause the relay to restore.

According to another feature of the invention in a signaling system impulses are transmitted to a distant controlled relay through which battery is fed to a line or cable over a loop circuit by alternately closing the circuit at the near end and inserting thereat a counter-electromotive force, the value of which is so related to the electromotive force of the battery at the distant end as to produce the desired static line conditions.

It will be appreciated by those skilled in the art that the above features of the invention do not preclude the normal operation of the circuit as regards supervisory signals, since these take place as a result of, or during, the closure of the near contact, and in this state the circuit conditions are normal. The invention therefore only changes the circuit from normal when the contact is opened, and as this latter effect is the basis by which such systems provide the selective trains of impulses to energize the distant apparatus, it will be seen from the following that the invention enables transmission of such impulses to be effected with less distortion than heretofore.

When "loop" impulsing methods are used on transmission lines whose reactance is appreciable, such as underground cable pairs, the arrival and decay current/time functions at the distant end are greatly different. For instance the decay function may take approximately three or four times as long to reach a substantially steady state, compared with the arrival function, and moreover has a different waveform with time. This is due to the change in the condition of the cable from short circuit to open circuit at the near end. Hence accurate reproduction of the impulses is extremely difficult, owing to the inherent differences in the operating waveforms and the mutual interference between them as the speed of signaling or the length of line is increased. These effects are of course well known, for instance in submarine cable telegraphy, and in order to overcome them resort is normally made to a signaling system whereby the battery is brought to the same end of the line as the contact, so that successive applications of battery and short circuit are possible. As central battery systems are practically essential in automatic telephony for transmission of backward signals it is not readily practicable to have the battery at the impulsing control end for reasons well known to those skilled in the art. However by allowing the opening of the contact to insert a counter-E. M. F. battery in accordance with the invention, the same effect is obtained in that the signals now consist of successive applications of a short circuit and a battery, the difference being that the battery acts as a counter-E. M. F. so as to restore the line current to the non-operating condition. In this manner the decay current/time function can be made similar in type to the arrival function so that for a given length of line the speed of signaling may be increased and vice-versa. In addition by causing the relay or other reception device to operate and release symmetrically about the current value equal to one half the total change, conditions for the minimum distortion of the received impulses are established. It is for this reason that a feature of the invention consists of making the counter-E. M. F. battery of substantially twice the value of the distant battery, so that the conditions referred to become the zero current value and permit the use of a polarised relay at the distant end. Some specific embodiments will now be described whereby the invention may be better understood.

Referring to the drawings.

In the following descriptions it will be assumed that the normal transmission bridges for confining the steady state D. C. signals to the given line are of the transformer type. Although the invention can be applied to the more usual condenser transmission bridge system, it is now considered that the latter has so many disadvantages due to transmission of longitudinal surges caused by signaling in the various portions of the complete speech path and due to the very inductive nature of the circuit under impulsing conditions, that its use where accuracy of impulsing performance is desired is inadmissible. It will also be assumed that the line over which signaling is required consists in general of two wires having the usual distributed constants and balanced with respect to earth, and that the most significant constants are the series resistance and shunt capacity.

Figure 1:
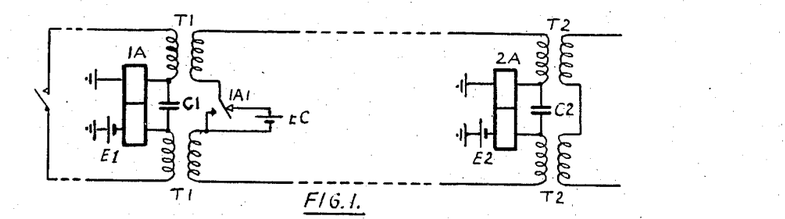
Fig. 1 illustrates the invention in its simplest form.

In these circumstances and as the battery at the distant end although earthed is connected to the centre point of the terminal impedances, no difficulty arises in the method of connection of the near contact and its counter-E. M. F. battery provided neither have an earth connection. The contact may consist, for instance, of a single changeover in which the moving spring and make contact are respectively joined to the ends of the near end wires via the transformer bridge and the usual supervisory relays, whilst the break contact is joined to the pole of the counter-E. M. F. battery of similar polarity to that received from the distant end on the moving spring. The other pole of the counter-E. M. F. battery is joined to the make contact, i. e. to the other wire. Such an arragement is illustrated in Fig. 1 in which the transmission path over which signaling is desired is represented by the dotted pair of lines joining the terminal transformers T1 and T2, the path being of a nature capable of passing direct currents and consisting for instance, of a cable pair. The transformers isolate this path from those preceding and following as regards the steady state D. C. signals but permit the through transmission of audio frequency currents. The direction of transmission of forward signals such as trains of dialled impulses is from left to right, and relay 1A may be regarded as responsive to such signals by the current passed through it from battery E1 under the control of a previous contact. The condensers C1 and C2 reduce the impedance of the relay 1A and its counterpart 2A at audio frequencies so that the latter may be transmitted without substantial loss. The contact 1A1 of relay 1A is shown in the unoperated condition and it will be apparent that the counter-E. M. F. battery EC opposes the flow of current from the distant battery E2. If the E. M. F.'s of EC and E2 are substantially equal then no line current flows, whilst if the former be twice the latter then a current due to the difference will flow from the former. When the relay 1A is operated EC is removed from the line and the current which flows is due solely to E2, and causes relay 2A to operate. Hence when EC equals E2 single current operation of 2A is obtained and when EC is twice E2 double current operation is present so that relay 2A may then be of polarised type, but with either condition the sending end of the line is always of minimum impedance, thus producing operate and release wavefronts of identical form and of minimum time duration. Also it will be noticed that when the circuit is in use and relay 1A is held operated, conditions are the same as for normal "loop" signaling methods so that normal supervisory arrangements and circuits may be used.

As is well-known the best possible conditions for accurate reproduction of the near end impulses by the distant relay are given when the received currents have equal positive and negative values, i. e. when the counter-E. M. F. is twice that of the distant battery. When the invention is applied in this preferred manner, due allowance must be made in the near end supervisory relay circuit design for the reverse current which flows when the contact is unoperated, since under the existing signal system the line current is reversed by a reversal of the distant battery when the called subscriber answers in order to effect metering at the calling end. This point will be dealt with in greater detail after the following description of the methods used to apply the invention in the case where the counter-E. M. F. battery may have an earth connection. It is obviously desirable that this condition shall obtain in practice, in order that the potential of this battery shall be stabilised with respect to earth so that it can be used as a common supply for a number of lines.

Figure 2:
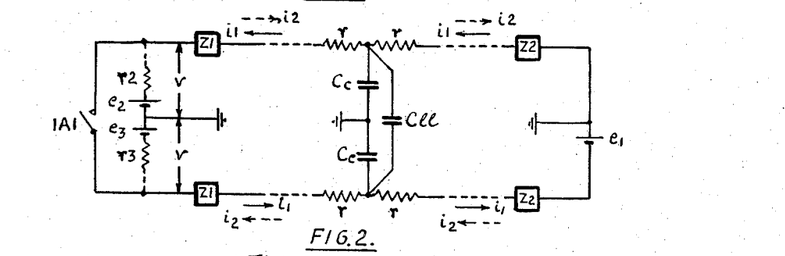
Fig. 2 illustrates diagrammatically an application of the invention when an earth connection is present in the counter-electromotive force.

Referring to Fig. 2, this figure shows a generalised circuit for the transmission path. Impedances Z1 and Z2 represent the necessary terminal impedances such as transformers and supervisory relays, resistances $r$ and capacities Cc. C11 represent an element of the line's distributed constants, the voltages of the near ends of the lines with respect to earth are $v$ and the line currents which flow are $i1$ and $i2$, where $i1$ is due to $e1$ when the contact 1A1 is closed and $i2$ flows when the contact is open. $e1$ is the E. M. F. of the distant battery and it is assumed that its positive pole is earthed.

Let it be assumed that the counter-E. M. F. battery consists of two series aiding components $e2$ and $e3$ of total E. M. F. greater than $e1$, having the junction of $e2$ and $e3$ earthed, and so disposed that the positive pole of $e2$ can be joined to the positive near end wire and the negative pole of $e3$ to the negative near end wire via two resistances $r2$ and $r3$ respectively. Let contacts 1A1 be joined to the near end wires at the same points to which it is possible to join $e2$ and $e3$. Let the necessary terminal impedances, relays and the like be disposed symmetrically with respect to earth and be included as portions of the cable pair. Let the effective constants of the cable be represented symbolically by equal series line resistance, equal capacities to earth, and line to line capacity. Then if the contact be operated without the connection of $e2$ and $e3$ to the lines, when the line current attains its steady state value the potential of the wire connected to the positive pole of the distant battery falls uniformly from zero at the distant end to $$\frac{-e1}{2}$$

at the contact with respect to earth. The potential of the wire connected to the negative pole of the distant battery rises uniformly from $-e1$ to $$\frac{-e1}{2}$$

at the contact with respect to earth. Hence both near end wires are at the same potential of $$\frac{-e1}{2}$$

with respect to earth. It is necessary to arrange the connection of $e2$ and $e3$ to the wires so that no change is effected in these steady state potentials, and that when the contact is opened no resultant earth current is initiated. Obviously the former requirement is met by a variety of values for $e2$, $e3$, $r2$ and $r3$, since we have:

$$\frac{r2}{r2+r3}(e2+e3)-e2=\frac{e1}{2}=e3-\frac{r3}{r2+r3}(e2+e3)$$

But when the contact opens $e2$ will now drive current into the upper loop via the earth, being aided therein by the charge $$\frac{-e1}{2}$$

on the upper wire with respect to earth, and $e3$ will perform a like function for the lower loop but is opposed by the corresponding charge on the lower wire with respect to earth. In order that no earth current shall be initiated it is necessary that the sending current/time functions of the two loops shall be identical and that the magnitudes of the currents shall be equal. Now the former requirement is met on the part of the cable wires and terminating impedances by assumption, so that it is only necessary to make $r2$ equal $r3$. The second requirement taking into account the fact that $r2$ must equal $r3$, gives $e3-e2=e1$, which will also be found to satisfy the above steady state equation.

The above are the requirements for the general case, and ensure that no earth current flows so that crosstalk and other mutual interference between pairs remains at a minimum. In particular for single current signaling (i. e. line current changes from zero to maximum in one direction) it is obvious that the sum of $e2$ and $e3$ must equal $e1$, so that $e2$ becomes zero and $e3$ equal to $e1$. Thus it becomes possible to use the battery which normally exists at the near end for operation of the relay contact as the counter-E. M. F. since as $e2$ is zero this means that its positive pole is earthed, and also provided the practical differences in potentials of the two batteries are such that the ensuing residual line current does not materially effect the operation of the distant relay, and in particular does not operate the latter when the contact is open.

As regards double current signaling where the line current changes between equal positive and negative values, the sum of $e2$ and $e3$ must be twice $e1$, so that $e2$ becomes one half $e1$ and $e3$ becomes one and a half times $e1$. These values can be obtained with economy in practice by using the local battery supply as a part of $e3$ and adding either two small groups of cells each substantially equal to $$\frac{e1}{2}$$

to each end of the local battery, or the use of a twin output mains rectifier unit in place of the additional cells. In either case the internal impedances of the additions will form a part of the feed resistances and should be so calculated. In applying the invention to a given piece of apparatus, such as for instance a relay set, either of the above methods of signaling can be used at will if the feed resistances are connected to U link points which can be strapped either to the local battery or the additional portions connected thereto.

The above method of applying the counter-E. M. F. via equal feed resistances does of course, result in the decay current-time function at the distant end being slightly longer than the arrival current/time function, owing to the introduction of the feed resistances. If these resistances are small compared with the line resistance the difference between the functions is very small, and of course becomes relatively unimportant as the length of line is increased, for a given value of feed resistance. As the effect on the longer lines is the most important consideration (since the current-time functions on very short lines are much faster, and small differences are therefore unimportant), then the use of feed resistances of say 200 to 500 ohms, is permissible. In addition and more particularly in the case of double current signaling, a definite use can be made of such small differences brought about by a limited change in the sending end resistance, in that the operate transit time of the distant relay can be approximately compensated by intentionally causing the decay function to be slightly longer. The remaining embodiments of the invention will describe means whereby the normal supervisory relays and functions associated with "loop" signaling may be incorporated without detriment to the described methods of impulsing. It is usual to associate with the sending contact four relays known as the I, D, B and C relays. The first two are essentially operated by the same line currents as operate the distant impulsing relay, except that the D relay only operates when the distant battery is reversed as regards the line potentials. It follows that these relays must be considered as part of the terminating impedances associated with the lines. On the other hand the B and C relays although operated by the local contact, perform this function from the local battery and therefore do not affect the impulsing arrangements, except in so far as to require a second contact operating in sympathy with the line contact in the usual arrangement. It will be shown that the need for this second contact disappears as does the need for the C relay, since the main function of the latter is to short the I and D relays after the first impulse and during the remainder of the impulse train, and it is proposed to leave these relays in circuit. The connection of the I and D relays in the circuit of the invention will first be described with reference to Figs. 3 and 4 which illustrate the near end termination only for single and double current working respectively.

Figure 3:
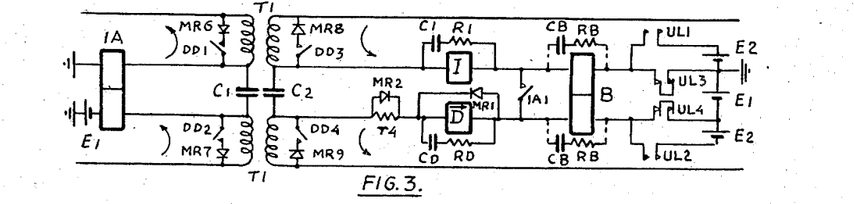
Fig. 3 shows the invention applied at the near end to a circuit in which supervision takes place and the counter-E. M. F. equals the E. M. F. of the distant battery.

Referring to Fig. 3 the supervisory relay I is non-polarised while the supervisory relay D may be polarised or non-polarised. When D is non-polarised then a rectifier MR1 must be connected so as to by-pass the normal line current and be operative only with reversed current from the distant end when the called subscriber answers. In these circumstances a resistance r4 shunted by a rectifier MR2 must be inserted as shown so as to keep the near end line impedances balanced for impulsing. When D is polarised neither rectifiers nor additional resistance are required but a retaining spring or bias must be used to position the armature.

The relays I and D are inserted in the respective line connections between the contacts IAI and the ends of the windings of transformer TI, which are connected to C2.

It has been pointed out in the description of the arrangements used when the counter-E. M. F. has an earth connection, that it is essential to keep the lines symmetrical with respect to earth. It follows therefore that impedances can be introduced into the line side of near contact, provided each line has the same added impedance and their values are sufficiently low in comparison with the line when the latter becomes long, and that they are preferably resistive in nature. Furthermore both I and D relays must essentially have the same operating sensitivity as the distant relay, and all three must be sufficiently sensitive in terms of the energy required to operate them to allow of the use of low resistance windings so that their effect on the line characteristics shall be a minimum and their voltage drop shall not require the use of large battery voltages on long lines. Hence it is proposed to use two relays of exactly the same type as the distant relay for the I and D relays and of resistances of the order formerly quoted as being suitable for feed resistance, i. e., 200 to 500 ohms. Each relay is shunted by a series condenser CI and CD respectively and resistances RI and RD respectively of values such that the nett impedance of each relay is resistive in the well-known manner. The determination of these values is arrived at experimentally by applying an interrupted D. C. voltage to the relays via a resistance and adjusting the shunt condenser/resistance until the voltage waveform across the relay or the current waveform applied thereto becomes substantially rectilinear. The types of relays to be used depend on the type of impulse signals and will be discussed later.

It will be seen that with the above method there is no need for the usual practice or short-circuiting the I and D relay, so that all impulses received at the distant end are similar as far as the line permits and also that the C relay can be dispensed with. The normal B relay must however be provided since one of its functions is to "busy" the apparatus as soon as it is seized and irrespective of whether the distant relay is being operated. The B relay can take the place of the two feed resistances used to enable the counter-E. M. F. battery to be applied to the lines as before described, provided it has equal windings and its impedance is rendered resistive as described for the I and D relays. If, as is usual, the B relay has a long release lag, obtained by a "heel slug" this provision may not be fully necessary, as the inductive component of such relays is very small owing to the shortcircuited turn. The effect of the above described method for rendering the I, D and B relays substantially resistive so that they act as feed resistances and do not materially affect the signaling current/time functions as the distant end, may be obtained in a different manner by shunting the relays individually with a circuit element possessing a high power law relationship between the current passed by the element and the voltage applied thereto. In a known form of this type of element the current is proportional to the fourth or fifth power of the voltage, so that the initial current surges required at the sending end of the line whose value greatly exceeds the normal line current will be by-passed from the relays. In this manner the desired effect of a low sending end impedance can be maintained.

The arrangement of Fig. 3 therefore includes an incoming line relay IA feeding battery from source EI back to a position where an impulsing contact is located, and transformer TI, condenser CI, all as in Fig. 1.

The counter-E. M. F. is derived from the battery EI (having an earthed positive pole) and two smaller batteries E2 connected in series with EI, one on each side.

Figure 4:
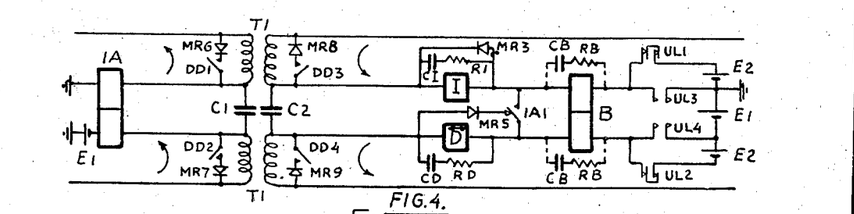
Fig. 4 shows the invention applied at the near end to a circuit in which supervision takes place and the counter-E. M. F. equals twice the E. M. F. of the distant battery.

U link arrangements UL1, UL2, UL3, UL4 are provided to permit of single or double current working at will (compare the connections of UL1, UL2, UL3, UL4 in Figs. 3 and 4). The double-wound slow release relay B which is rendered resistive by means of the resistances RB and condensers CB shunting its windings is connected between the counter-E. M. F. and the contacts IAI, the circuits from the other side of the contacts IAI to line have already been described.

Figure 5:
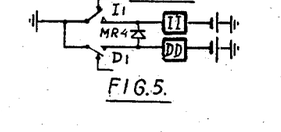
Fig. 5 shows a circuit arrangement for relief relays for the arrangement shown in Fig. 4.

Fig. 4 shows an arrangement for double current supervision in which the I relay whether polarised or not has a rectifier MR3 for the purpose of by-passing the reverse line current when the contact is open. This relay therefore energizes when line relay IA operates, remains operated during impulsing due to the short-circuit effect of MR3 on its winding and releases when the line current is reversed on the called subscriber replying. In Fig. 5 relief relay II and DD for relays I and D respectively have their circuits so arranged that a rectifier MR4 connects their free terminals together whereby relay II is energized permanently throughout a call i. e. whenever either relay I or relay D is operated. The release of relay I when the called subscriber answers is a new facility in the art and although it may be used as such, the relief relay II which is permanently operated can take over its normal functions.

As regards the D relay circuit when using double current impulsing, it will be appreciated that it is required to distinguish between the reverse current normally flowing (i. e. when the near contact is open) and the reverse current which flows when the distant battery is reversed. In the first case the D relay is not required to operate and in the second it must operate. The change of state of the near contact may be used to perform this distinction. For instance, if the D relay be of the non-polarised type and the changeover contact operating in sympathy with the near contact be available, then the latter can be arranged so as to shunt rectifiers in turn across the relay with its operation, the rectifiers being so connected that the impulsing line current always passes therethrough despite the reversals. When impulsing has finished and the distant battery is reversed this cannot affect the near contact and therefore the D relay operates. For similar reasons as applied to the I relay it will in general be preferred to use a polarized relay for the D relay and this enables the extra near contact to be eliminated, since by connecting the relay so as not to be operated by the normal line current (i. e. when the near contact is closed) the rectifier performing this function formerly can be removed together with the contact. In particular it is arranged as shown in Fig. 4 that the moving spring of the near contact is connected to the line in which the D relay occurs, and the make contact to the other line (i. e. the junction of the I and B relays). Then the break contact is connected to the other side of the D relay via a rectifier MR5 of such polarity that when the near contact is unoperated the normal reverse current passes therethrough. At the end of impulsing when the near contact remains operated then the D relay is ready for operation by the subsequent distant battery reversal.

It should be explained that the arrow shown in the relay D indicates the direction of current to cause the operation of the relay. The armatures of I and D when polarised must be positioned by retaining springs or biases.

It will be noted that normally current flows through the B relay in Fig. 4, that is when contact 1A1 is back, as the counter-E. M. F. exceeds the battery E. M. F. at the distant end. This current is however very much smaller than the current which flows through its windings when the contact 1A1 is operated. This involves a certain amount of marginal design for relay B but on the other hand it simplifies the problem of holding during impulsing. In the worst case of a line having zero resistance it is possible to arrange that the change in B relay current is not less than 4 to 1 which enables a practical design to be achieved.

Use is made of transformer type transmission bridges for coupling together the paths for audio frequency signals, in order that no longitudinal impulsing surges may interfere with the performance of any one path. However it is still possible for transverse surges to provide interference of sufficient magnitude to alter radically the impulsing performance of one path. Such surges can be substantially and conveniently suppressed by the appropriate connection of metal rectifiers across the windings of the transformer during impulsing. It can also be arranged that the flow of line current when the circuit is in use and prior to the answer signal, is in such a direction as to produce a voltage on the rectifiers in the backward direction, so that the additional transmission loss during this period is negligible. In addition it can be arranged that the rectifiers are disconnected upon receipt of the answer signal, and that they are not connected until the circuit is seized, so that their required performance is dictated solely by their ability to suppress surges.

As the surges will be of both positive and negative polarity, it follows that the rectifiers must be in pairs and connected back-to-back. If both rectifiers are connected to one winding then one of them is bound to be conducting, so that the transmission loss will be large. However by connecting the pairs one to each side of similar windings, arranging that the connection of the windings is "straight through" (i. e., the alternating voltages on similar windings are in phase), and ensuring that the line currents under seized conditions prior to the answer signal cannot pass through the rectifiers, as shown in Figs. 3 and 4, all the desired conditions can be met. In addition this method of connection of the transformers ensures that the normal line currents produce only a flux due to the difference of the total primary and secondary ampere-turns. The rectifiers MR6, MR7, MR8, MR9 are connected in circuit by contacts DD1 to DD4, and it is arranged in Fig. 6 that relay DD is operated by contact I2 and released by contact D2, thus ensuring that they are only in circuit for the period between seizure and answer. In these circumstances the rectifiers are not called on to pass relatively heavy currents for long duration, and the only requirements are that they shall withstand the maximum steady backward voltage due to the line currents passing through the windings (in general about 1 volt), and have the lowest possible forward resistance consistent with a backward resistance giving the permissible additional transmission loss to supervisory tones. It has been found that the types used as acoustic shock absorbers in telephone receivers are eminently suitable.

Apart from the question of being able to work each signaling path under ideal conditions, the use of such rectifiers also prevents the transmission of all surges via the speech path so that from this point of view, impulsing over amplified junctions in which the D. C. path is taken via the quad circuit can be carried out, without the probability of over-loading the amplifiers.

Figure 7:
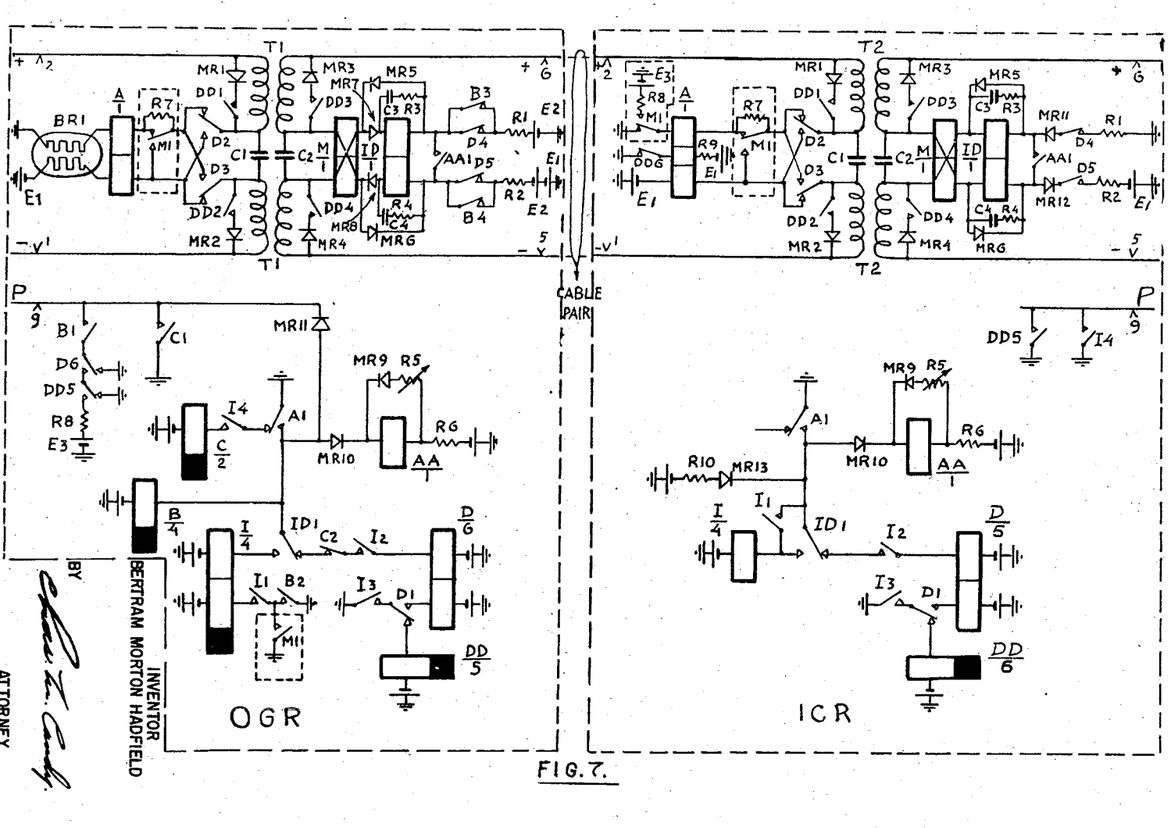
Fig. 7 shows a complete circuit embodying certain refinements not present in the arrangement shown in Figs. 3 and 4.

The elementary circuits so far described have certain disadvantages in practice and Fig. 7 shows an alternative circuit designed to remove or reduce these.

In order to economise in the description a specific circuit layout for the O/G and I/C relay sets will be described, using certain preferred types of backward signal, but it should be understood that other forms of backward signal can be used and may have advantages in certain circumstances. The circuit will be illustrated by diagrams showing the line currents for the types of backward signal to be used, and provision has been made for the following in addition to the normal signals associated with seizure, dialling and answer as before described:

(a) Repetition of busy flash over ordinary junctions, i. e., those between automatic exchanges having manual boards.
(b) Manual hold and operator flash on satellite junctions, i. e., those between a main exchange having a manual board, and an exchange not having a manual board.

Re-ring facilities subsequent to manual hold can also be provided with little extra difficulty, but will not be specifically described.

Fig. 7 shows these circuits in detail, and as it will be seen that there is considerable similarity between them, the same numerals and letters have been used in both for items which as far as possible perform the same functions. The double current method of impulse signaling has been chosen over the cable pair, as this method is fundamentally sounder, but the circuit operation can just as easily work for single current signaling when the appropriate changes are made in the counter-E. M. F. at the contact and in the type of I/C relay as previously described. All contacts are shown in the unoperated condition.

Figure 6:
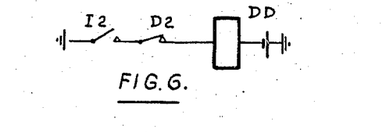
Fig. 6 shows an auxiliary circuit for use with the arrangements shown in Figures 3 and 4.

The outgoing relay set OGR is shown within the dotted lines on the left-hand side of Fig. 7. The connections to the incoming pair are made at points 1 and 2, and it is assumed that this pair is looped either by a contact (as from a subscriber's instrument) or by a similar contact and apparatus as is shown connected between points 5 and 6 of the I/C set (via a group selector). The speech transmission bridge consisting of transformer T1, condensers C1, C2, metal rectifiers MR1 to MR4 and contacts DD1 to DD4, is exactly similar to those described before in connection with Figs. 3 and 4 and performs the same functions. Likewise the relay DD is controlled by the same contact sequence as shown in Fig. 6, except that the contacts are lettered I3 and D1.

A high speed relief relay AA is used for controlling the impulsing contacts now referred to as AA1 while the B relay is removed from the influence of the counter-E. M. F. and placed in auxiliary circuit while resistances whose value can be selected with sole regard to impulsing conditions are substituted therefor in the counter-E. M. F. circuit.

Relay A which responds to a loop on the incoming pair and to dialling impulses, is of well known small time constant construction and has one changeover contact A1. The current in this loop obtained from the battery E1 is fed via a barretter BR1, in order that it may be of satisfactory value for a subscriber's transmitter, should this set be seized by a subscriber. The contacts D2 and D3 relay the answer signal by reversing the current in the loop, in the normal manner; such operation only being effective of course, when the loop includes apparatus responsive to such reversal (for instance it is not usually effective when the loop includes a subscriber's instrument). The contact M1 and resistance R7 are only inserted in a relay set terminating an ordinary junction and are for repeating busy flash as described later.

Comparing the outgoing side with Figs. 3 and 4, it will be seen that several alterations have been made in the relays, but that the position of the contact AA1, the feed resistances R1 and R2, and the batteries E2 and E1 are substantially the same. The contact AA1 is, of course, located on the relief impulsing relay AA, the feed resistances are equal (some 400 ohms each being found satisfactory), and the batteries E2 are of value substantially one half E1 and may be small mains rectifier units as described before. Of the contacts D4, D5 and B3, B4 the first two relieve the batteries of the local current when AA1 is operated and speech is in progress and also permit the call being under the control of the calling subscriber, whilst B3 and B4 permit manual hold conditions to be established by a backward signal.

Relay ID which takes the place of both I and D relays in the line, has a balanced winding in each line to mitigate fortuitous earth current interference. Condenser/resistance circuits C3, R3 and C4, R4 are provided as compensation as described before so that each winding of ID acts as a series line resistance, and is shunted by rectifiers MR5 and MR6 so that it is only operative to currents from the distant battery (when AA1 closes). Additional rectifiers MR7, MR8 are generally advisable when the reverse current is large in order to prevent incipient operation of ID owing to the voltage drop across the shunt rectifiers, but can be arranged so that with MR5 and MR6 they form single items. Relay ID is of normal telephone type and its sensitivity primarily determines the ohmic limit to the length of the junction. This relay performs both the normal functions of the I and D relays, by operating when AA1 operates (if the loop and battery conditions from the distant end are correct) and releasing when the answer signal of reversed line current from the distant end is received.

Relay M is similar to ID in all respects except in the sense in which the windings are connected in the line wires, and is designed to respond only to backward signals. The diagonal cross drawn in the winding is meant to indicate that the windings are "crossed" as regards normal loop currents, i. e. one line winding is reversed so that the flux produced by both windings when the line currents are only of the loop type, is zero. Hence this relay does not need compensating and only acts as a resistance on impulsing. It will, however, respond to a difference in line currents, which may be brought about by unbalance of the circuit as regards battery voltages or other means; the former being the method whereby backward signals from the distant end are detected.

As regards the local relay circuit shown detached, this will be described by taking the operation sequence to a successful call, i. e. in the absence of any backward signal other than the answer signal. The operation on busy flash and manual hold necessitates consideration of the complete setup and will be described later. Assuming relay A is operated by a loop between points 1 and 2, then contact A1 immediately busies the private wire P via rectifier MR11, operates AA via MR10 and R6, and operates B. Contact AA1 causes ID to operate from the distant battery, and ID1 operates I which is then held operated by its own contact I1 since B2 is operated. The adjacent contact M1 replaces that shown in the A relay circuit on a satellite junction only and need not now be considered. B1 reinforces the earth on the private via D6 and maintains it during impulsing; the operation of B3 and B4 is ineffective at this stage. I2 prepares a circuit for operating D, I4 does the same for C, and I3 operates DD, thus connecting up the transformer rectifiers MR1, MR2, MR3 and MR4 via DD1 to DD4 and preparing for positive battery metering via DD5. Dialling may then proceed, and on the first break of A1, relay C is energised and holds in for the duration of the train by means of its normal slow release feature; relay B of course also remains operated during impulsing for the same reason. When the called subscriber answers, ID releases and operates D since C2 will now be normal. D1 releases DD and retains D via I3, and during the release lag of DD the positive battery E3 is applied via R8 to the private to give the meter signal; MR11 retains the earth on the private for the transit time of DD and D.

Release of the connection by the called subscriber only re-operates the ID in the I/C set (by restoration of the normal battery at the distant end—this effect being a repetition of the original restoration in the final selector, via the I/C set) and since both I and D in both sets are operated, has no effect. Release by the calling subscriber however, releases A and AA, operates C, releases B and then I and then D, and hence the whole connection. The private is guarded for a time equal to the sum of the release lags of B, I and C and as the latter one is much larger than that of D (the last relay to be released, apart from C) then adequate guard is obtained. There is also adequate guard to ensure the release of the incoming relay set ICR and group selector, as will be described later.

As regards the timing requirements of the four release lag relays there are no inter-locking requirements, and those of B, C and DD can be normal; the release lag of I is only required when M is to be operated (see later) and must exceed the operate lag of the latter, so that some 50 milliseconds is adequate.

It might be thought that there is a possibility that ID will impulse, but this is not so in practice for two reasons. One is that, the required adjustment of the relay is prejudicial to impulsing, and the other is that the operative current pulses when the AA1 contact closes exceed the steady state value on account of the discharge of the line capacity. In any case the C2 contact would prevent such operation from becoming effective to energise relay D, although the inclusion of this contact is primarily made for the purpose of preventing the calling subscriber from re-metering himself, should he recall whilst the O/G set is clearing down (i. e. during the release lag of B plus I).

The inclusion of the relief impulsing relay AA may be turned to advantage, by adjusting the circuit of the latter to compensate for the combined transit times of the A and AA relays. This is the purpose of rectifier MR9 and variable resistance R5, since as the former is only operative to the back E. M. F. of AA (when A1 releases), then by adjustment of R5 the release lag can be altered to effect such compensation. Rectifier MR10 is necessary in order to protect AA from the combined back E. M. F.'s of the other relays operated from the A1 make contact, which would otherwise produce impulse distortion.

The incoming relay set ICR (shown in dotted lines on right-hand side of Fig. 7) is to a large extent precisely similar in layout and operation to the O/G set, and so no detailed recapitulation will be given. The differences will now be described.

The A relay will now be of the polarized type as double current working is being used, and it becomes necessary to consider whether there is the possibility of momentarily having no current in the windings, thus tending to give an indeterminate position to the armature. This condition is possible if the AA contact in the O/G set is released before either the contacts B3, B4 or D4, D5 have restored. This always obtains when the calling subscriber clears, except when clearing against a busy connection (since D will not have been operated), and for a time dependent on the release lag of B. It is the purpose of the third (middle) winding on A to ensure that there is always a flux due to the current from E1 via R9 and DD6, which tends to restore the armature to normal. This flux is a small percentage of the normal flux and does not therefore materially affect the normal contact pressures, and furthermore is only present when DD is unoperated. As the only time DD is operated is during impulsing and prior to the answer signal, it follows that the impulsing performance of A is not affected by this feature.

The alternative connections of the M1 contact and its associated circuits will be described later when the backward signals are taken.

The rectifiers MR7 and MR8 which were placed in series with the ID relay in the O/G set, are now not necessary since there can be no reverse current as we are using the same battery E1 for counter-E. M. F. as is used for operating the group selector or next O/G relay set. A similar assembly can be used however, because another pair of rectifiers are needed as shown at MR11 and MR12. These latter are necessary because it will be needed to impulse the A relay in the group selector or final selector, and this must be done on an effective "loop/disconnection" basis if considerable distortion is not to ensue. This A relay will be of conventional telephone type, bridged across the line, and possessing considerable inductance. If the rectifiers were not there, then when AA1 breaks the back E. M. F. of the selector A relay would find a path for current via the feed resistances R1 and R2, instead of the normal "disconnection" via a spark quench condenser. This will result in considerable positive distortion, but the inclusion of MR11 and MR12 will present a high impedance to this back E. M. F. which as is well known, is of such polarity that it tends to pass current into the battery.

As regards the I relay, it will be noticed that this has no intentional long release lag and is directly under the control of the A contact for release purposes. This is done in order to ensure the earliest possible release of ICR and its group selector. The group selector associated with ICR is arranged to be held forward by the earth on the private; for this purpose the continuity of the private wire through the group selector via the normal make H relay contact, is removed by simply disconnecting this contact. The group selector is otherwise of normal type. Hence in order to clear the group selector down, only needs the removal of this earth via contacts I4 and DD5. Now in a normal successful connection the DD5 contact is only needed in order to maintain the earth on the private should relay I impulse during dialling, and will ordinarily have been released by the answer signal. Thus the release of the group selector by the calling subscriber is fast, since it is only dependent on the sum of the release lags of the A and AA relays in the preceding O/G set OGR, plus the release lag of the present A relay, and I relay. If the called subscriber releases first with consequent re-operation of ID, the release still follows the same procedure since D is held by its own contact D1 via I3. The longest release lag is obtained when clearing from an ineffective call, since D will not have been operated and the earth on the private will be maintained for the additional time of the release lag of DD. Under these conditions, however, and since no answer signal has been received, it is only necessary that the release lag of DD shall be less than the sum of B, I and C in any succeeding O/G set, in order that the group selector shall clear first. This condition is obviously easy of attainment.

Since the last discussed condition does give a longer release period for the group selector than normal without ill-effects, it may be queried as to why the I relay cannot be given the same release lag and thus dispense with that on DD and also the DD5 contact. There are two reasons why this is undesirable. The first is that should the calling subscriber re-call when ID will have been released, and before the I relay has released, (for instance, after an ineffectual call), then the D relay may be operated during the operate lag of ID, when it will lock via its own contact D1 and I3 and hence give the standard answer signal with metering. This could, of course, be obviated by a small operate lag on D, but in view of the second reason is hardly worth considering; it being assumed, of course, that the chance of a re-call during the normal release lag of I is negligible. The second reason is that under manual hold conditions and when the subscriber clears, the present D relay must restore to normal before the B3, B4 contacts in the O/G set, as otherwise the correct backward holding signal will not be received by the latter. As the D release is dependent on I, it follows that the latter cannot have a release lag comparable with B, which it would have to have if it is to hold over impulsing.

A spark quench of some form will be needed for the I relay as it will be a normal telephone type of large inductance as compared with AA, which is of the low constant and low inductance type. If a conventional condenser/resistance quench be used there is the probability that the E. M. F. across I on release may reverse in sign, owing to the oscillatory nature of the circuit. As this relay is effectively in parallel with AA such an E. M. F. would cause MR10 to become conducting, with consequent detriment to impulsing. Hence it is preferred to use a rectifier MR13 and series resistance R10 in shunt with I, and operative only to the back E. M. F. This circuit is non-oscillatory and has the further advantage of permitting the adjustment of the release lag of I to suit the requirement that DD shall hold over impulsing.

It will be noticed that the D4 and D5 contacts are not here supplemented by B contacts (or contacts performing a like function) as in the case of the OGR set. This is because in the case of the OGR set it is desired to maintain the reversed battery answer signal, where the outgoing set is located at a satellite exchange having discriminating selectors, so that the latter may function correctly under manual hold conditions (i. e. so that the I relay in the discriminating selector may be held when the subscriber hangs up). This means that the D and I relays in the OGR set must be held (which is done by M1, but see later), so that contacts B3 and B4 then become necessary in order that M may be operated when the subscribed clears. This is not necessary in the case of the set ICR and in fact D must be allowed to restore in order to transmit the proper hold signal backwards.

Some types of backward signal and means of detection and repetition will now be described which are actually proposed for use in Fig. 7, but reference will also be made to other possibilities later on. The backward signals and circuits to be considered are, busy flash and manual hold, and the respective line signals are similar to those in conventional use, namely negative battery to both lines, and positive battery to one line with negative to the other, respectively (the polarities are with reference to earth, remembering that the normal battery supply has its positive pole earthed).

Figure 8:
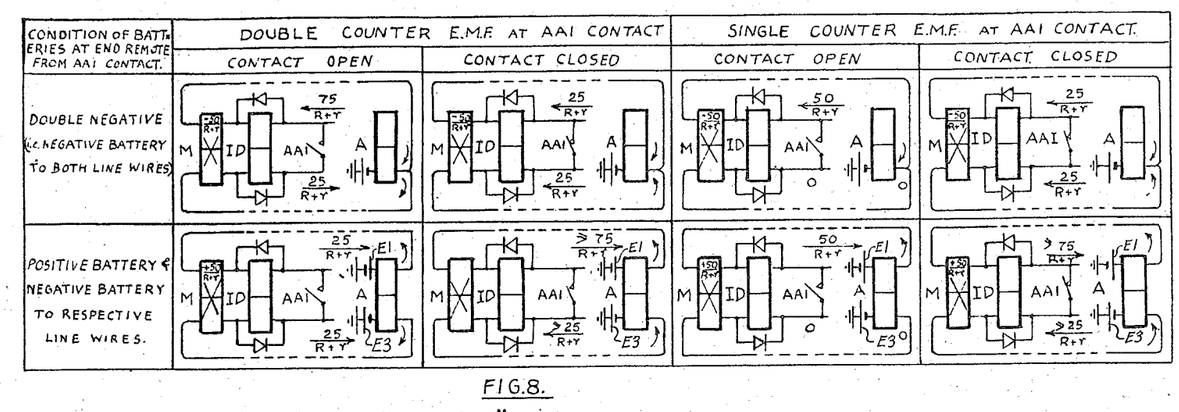
Fig. 8 illustrates various circuit conditions under busy flash and manual hold signaling.

Fig. 8 shows a schematic diagram of the essential line and termination conditions, under the two backward signals to be discussed. It is necessary to consider the effects of such signals on both M and ID relays, and the latter has been shown in abbreviated form as regards the rectifiers; also the effects due to the line contact AA1 being open or closed and the action with double counter-E. M. F. (i. e. double current impulse working) and single counter-E. M. F. (i. e. single current impulse working) must be considered. Again for the sake of brevity although the batteries which change the line conditions and bring about these signals have been lettered E1 and E3 to conform with Fig. 7, it has been assumed that both have a voltage of 50 and the line currents have been quoted with the upper figure on this basis. Also the total ohmic resistance of a line and its part of the terminations including the relays, is denoted by R and the resistance of one feed resistance by r. The current figures quoted inside the relay M are those which will produce operation of this relay, i. e. the difference between the respective line currents since M is connected with "crossed" windings whilst their values are assigned plus or minus signs which will be useful when considering the possibilities of selective backward signaling. The counter-E. M. F. batteries and feed resistances at the AA1 contact have not been drawn, as they are precisely similar to those previously described.

Now the present busy flash signal is obtained from a selector in the desired signaling path (i. e. an intermediate group selector or a final selector), and is of the same form as that proposed. Even although present policy is to dispense with backward repetition of this signal, it will still be met and must be recognised as such if incorrect operation of the preceding circuits is to be avoided, apart altogether from questions as to the difficulties of operating procedure involved by non-repetition of busy flash. It is just as difficult to recognise this signal in order to prevent misoperation of the signaling circuits, as to repeat it backwards, and as this system minimises the latter difficulties it follows that recognition and repetition of busy flash must be considered.

From Fig. 8 it will be seen that the total flux-producing current obtained in M is always $$\frac{50}{R+r}$$

irrespective of the condition of the contact or batteries, and as this value is the same as the total produced in ID under normal loop signaling, then the same type of relay can be used. Hence the normal busy flash signal can be detected by M, and it can also be used over the cable pair whatever the type of impulsive signaling. As regards the ID this will hold in on half current when the contact is closed, but will release when the contact is open. It follows therefore that conditions for clearing in the intervals of busy flash will be satisfactory, if it is arranged to hold all the A relays during busy flash irrespective of whether the subscriber has actually cleared; this latter feature also prevents unnecessary relay operation during busy flash. This explains the methods shown in Fig. 7 for repetition of this signal over ordinary junctions. The M1 contact is arranged on the line side of the A relay in the form of a changeover such that operation of this contact applies double negative to both lines via one winding of the A relay, the current flow through this winding being such as to hold it operated irrespective of the condition of the subscriber's loop. The nett flux-producing current in this winding is, of course, the same as that produced in M since both are due to the earth current flowing between the terminations. The resistances R7 are designed to hold the A relays during the transit period of the M1 contact, and in the case of the O/G set operating from a subscriber's or similar loop to hold this relay should the subscriber clear during busy flash.

The question of normal release of the circuit after busy flash has been dealt with from the point of view of the guarding period on the private of the O/G set. Should however the subscriber clear during the interval of busy flash, then provided the next period is not received before the DD relay in set ICR has released, the clear is again normal, since the release of the group selector cuts off such reception. Should it be received however during the release of DD then the effect is to re-establish the circuit conditions by operating all the A relays. This will not be completely successful under certain circumstances, since the ID relays have to operate on half current. If it is successful in this respect then the sequence is as before, except that now the circuit will have time to clear during the next complete interval in busy flash. If it is not successful then lack of operation of ID in set OGR is immaterial (because I is released), and lack of operation of ID in the set ICR merely means that the release of DD proceeds normally, and when it does release, the group selector is released thus cutting off busy flash and substituting normal battery if the former is being received from a subsequent selector, if busy flash is being received from this group selector, again the release cuts it off, and from then on the circuits clears down normally.

The manual hold signal and calls to the manual board via a junction in general will now be described.

Calls to a manual board in the subscriber's exchange present no difficulty of course, since the operator can be regarded as a local subscriber, and are routed via the normal equipment.

In general, it may be taken as axiomatic that calls to a manual board in a main exchange from a satellite exchange require different backward supervisory signals from ordinary functions, with the sole exception of the normal answer signal. For instance repetition of busy flash is not required and has no significance. Hence the M relay function can now be used solely for signals such as manual hold and re-ring. Furthermore there is no reason to suspect that such a call will be made over more than one junction, although it will be apparent that the case could be dealt with.

The above does not mean that different electrical signals must now be used, but only that the interpretation must be different. Thus it would be quite legitimate to use the same signal as for busy flash, were it not for the fact that as it will be continuously applied, the subscriber could not flash the operator. The signal used over the junction in these circumstances, affords a good demonstration of the inherent flexibility of the present system, in that while different from previous signals in its possibilities, it is nevertheless applied in a simple manner and results in no additional complication to the basic circuit arrangements.

The manual hold signal applied to the satellite junction must be capable of allowing the subscriber to flash the operator. Hence use is made of the second alternative given in Fig. 8, in which positive battery replaces the earth on the upper line wire. Again it will be seen that the flux-producing current in M is $$\frac{50}{R+r}$$

under all conditions. As regards ID this will hold under the first condition but may not operate, and will do both under the remaining three conditions. The interesting feature is the functioning of the A relay, and it will be seen that when the contact is open the flux-producing current from the lines is zero, and when closed is operative (using double counter-E. M. F.) This permits the subscriber to recall the operator. Hence the M1 contact in the I/C set in Fig. 7 is now connected so as to changeover to the positive battery F3 via protective resistance R8, in the case of a satellite junction. At the set OGR the M1 contact is now used solely to hold the I relay when the subscriber clears, in order that (a) the D relay may be held operated to send reverse battery to a possible discriminating selector and (b) to maintain the earth on the private via C1 (C being held by I4 and back contact of A1). Of course the polarised A relay in the I/C set is held non-operated by the third winding flux as described before, when the subscriber clears.

Figure 9:
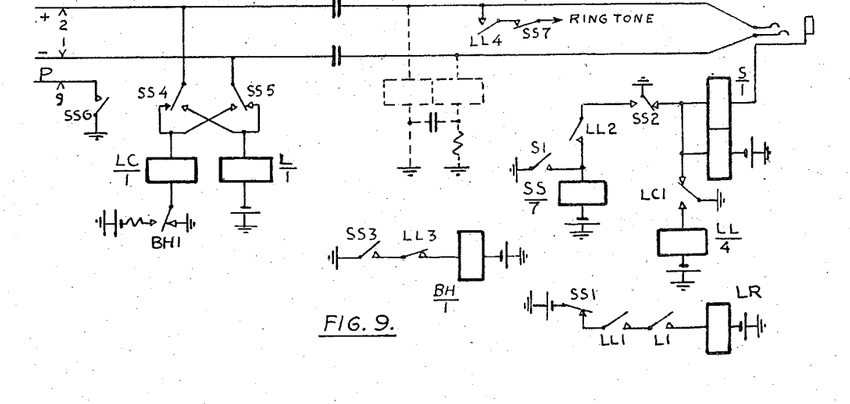
Fig. 9 illustrates a manual board for signaling back over a connection employing impulse repeaters according to the invention.

The manual hold signal need not be different from busy flash, so long as it operates M and permits of subscriber flashing. Double negative can be used from the line equipment to the I/C set in this case, because two separate line relays are used and by reference to Fig. 8 for the single counter-E. M. F. case it will be seen that when the contact is open one line current is zero, whilst when it is closed both line currents are capable of operating two separate relays. (*Note.*—This condition is always true if the same battery is used for both counter-E. M. F. and line equipment.) Hence if the LC relay in Fig. 9, showing the essentials of the line equipment, be connected so that when SS4, SS5 have operated it is influenced by the current in the lower line wire, then the operator's cord circuit lamp may be flashed. SS4 and SS5 provide the normal answer signal from the operator when S is operated by the insertion of the answering plug; this signal being necessary for repetition at the O/G set in case a discriminating selector should obtain at the satellite exchange. The calling signal on the line equipment is of course, the operation of L and LC with consequent operation of LL via LC1, and of the lamp relay LR via SS1, LL1 and L1; ringing tone being transmitted back to the subscriber via LL4 and SS7. When the subscriber clears, LC releases, releasing LL, and BH operates via SS3 and LL3; contact BH1 then applying negative battery in place of earth for operating the M relays and holding the satellite equipment.

One of the reasons why double negative has been chosen as the hold signal from the line equipment, is that the inclusion of the rectifiers MR11 and MR12 in set ICR precludes the use of any backward signal containing positive battery, owing to the current in the resistance R1 tending to be of wrong sense in these circumstances. However, it would have been just as easy to use a double earth signal for this purpose, so that this limitation is not very real.

Of course under manual hold conditions the control of the group selector must be in the hands of the operator for clearing, so that the incoming private wire of the group selector must be brought up to the line equipment. The group selector may be held by the earth from SS6 (Fig. 9) under the control of the operator.

With the circuits described, metering is only possible on manual board calls because it is desired to send back to the satellite exchange the reversed battery answer signal so that a standard discriminating selector may operate satisfactorily. But in such circumstances metering is made impossible normally, as is well known, and therefore the same principles can be used in satellite exchanges not having discriminating selectors. For instance, a simple uni-selector circuit may be arranged to disconnect the meter pulse circuit when the dialled pulses correspond to an operator call.

Other possibilities are just as easily applied, and thereby enhance the value of this system;

no detailed exposition will be attempted since this will be readily apparent to those skilled in the art.

One alternative has already been mentioned, namely double earth from the A relay end. This signal gives line currents exactly the reverse of double negative, and hence could be used in addition to the latter for the purpose of providing a different effect. For instance if an additional M relay were used and both were of polarised type, then one would be operated by double negative and the other by double earth, if appropriately connected. In this way, it is possible to cater for a re-ring signal, without substantial complication to the circuit.

Another signal is double positive from the A relay end, which adds a figure of 100 to the previously quoted relay and line currents, as compared with double negative. For instance, the upper line current in Fig. 8 (for the double negative and taking the first example), becomes $$\frac{25}{R+r}$$

in the reverse direction whilst the lower line current becomes $$\frac{125}{R+r}$$

in the same direction.

Yet another is positive to the line formerly earthed, and earth to the line formerly having negative battery. This signal can be approximately stated to add plus 50 to the lower wire currents and minus 50 to the upper by comparison with double negative, although the sign of the current in the lower wire when the contacts are closed depends on the ratio $r/R$. When the latter is unity these lower wire currents are zero, for instance, and this feature may have uses in certain instances.

Having introduced a battery on the other side of the normal transmission bridge, it is an obvious step to consider whether the junction circuit between the terminating bridges can be made to work on both way principles. This depends to some extent on the additional complexities of the line relay circuits and the local relay circuits. However, it has been demonstrated that the latter are substantially the same already with the exception of the private guarding arrangements, and the inclusion of additional line relays presents no insuperable difficulties, provided use is only made of those necessary for the particular direction of signaling under consideration. The necessary switching of the appropriate battery voltages also follows as a function dependent on which end is seized first, in fact the main difficulty will be that normal to such circuits, namely prevention of double seizure. In general however, it may be possible merely to add the necessary additional relays to the present incoming relay set ICR in order that it can perform the same functions as the present outgoing set and to switch the transmission bridges over so as to be "facing" the right way, and thus save the additional line relay equipment. The same switching function could, of course, connect a group selector at the appropriate end.

To sum up it will be appreciated that the invention is characterised by the following points which however are by no means exhaustive.

1. The arrival and decay current waveforms at the distant relay are made similar and of minimum transient duration, while yet unabling the use of normal loop supervisory backward signals, by the use of a source of counter-E. M. F. in place of the conventional disconnection during the break periods of dialled impulses.

2. By making the value of the counter-E. M. F. twice the nominal battery voltage at the distant end, a practical form of double current working on impulsing can be obtained with all the attendant advantages.

3. By compensating the local line supervisory relays, no line switching between the first and succeeding impulses is required, hence making for uniformity between such impulses. Such compensation may be complete (i. e., so that the relays act as series line resistances) or partial with a view to possible improvement of the received current waveforms.

4. The signaling loop is completely isolated from those on either side by using transformer speech transmission bridges and appropriately connected rectifiers on the windings during impulsing, so as substantially to eliminate both longitudinal and transverse surges respectively. Additional and random impulse distortion due to dialling on associated paths is thereby rendered negligible. Speech transmission loss per junction should not exceed 0.7 db. Additional equipment per junction is one simple I/C relay set.

5. The current drawn from the batteries in the line is small, and in particular the counter-E. M. F. is disconnected during speech.

6. Standard types of relays can be used throughout, all being directly operated from the batteries.

7. Backward supervisory signals such as busy flash, manual hold, and re-ring can be repeated with a minimum of circuit complication. The basic relay requirements are three line relays per outgoing or incoming relay set, with six local relays for the former and four for the latter.

8. Impulse distortion on each repetition at the relay sets can be made and maintained zero; distortion over the junction link is entirely a matter of the degree of control applied to variables such as battery voltage and polarised relay adjustments (i. e. lack of equality in contact pressures).

9. Impulse distortion with short period pulses is within 0.8 mS over a range of 20 to 60 mS make and 0 to 80 miles for the junction, and within 0.5 mS for the exchange path up to 800 ohms on a through connection.

10. Improvement in the slope and "squareness" of the received current waveform is perfectly feasible, as is also a better winding for the polarised relay, with the consequence that the above figures can be improved as regards the junction.

11. The impulsing arrangements into the exchange apparatus, are on a single current basis and therefore operate this equipment successfully.

12. The limits of operation are dependent only on the distortion tolerable by the ultimate exchange apparatus. Hence connections can be set up at will and from any intermediate point by normal methods.

13. The basic design is such that check of the performance of any signal path or link can be made rapidly, but should be required seldom. Owing to the substantially complete isolation of each path on dialling, the building up of tandem connections is practicable solely by using simple arithmetic as regards overall distortion. This also facilitates the keeping of records.

14. The basic local relay set design does not require difficult inter-related release lag timing on the relays; most of the slow release relays perform standard functions and may be of standard type.

I claim:

1. In an impulsing system comprising a loop circuit terminating at the far end in a line relay having a source of current connected thereto, means for making and breaking the loop circuit at the near end to cause intermittent operation of said relay, and means for inserting a counter-electromotive force in the loop circuit whenever the same is opened by said first means to aid in the rapid deenergization of said relay.

2. In a telephone system, a line circuit, a relay at one end of said circuit, a source of current connected in series with the winding of said relay and said line circuit, contacts at the other end of said circuit for opening and closing said circuit to cause energization and deenergization of said relay by current flowing over said series circuit from said source, and means for introducing a counter-electromotive force in said circuit in opposition to said first source of current, while said contacts are open to thereby aid in the deenergization of said relay.

3. A signaling system for telephone or like systems comprising a pair of conductors, a line relay in bridge of said conductors and a source of electromotive force in series with said relay, a pair of contacts in bridge of the opposite end of said conductors, means for opening and closing said contacts, a second source of electromotive force in bridge of said contacts, said second source having a value at least equal to said first source, said contacts, when closed, shunting said second source and causing current to flow through said relay from said first source, said contacts, when opened, causing said second source to be connected to said conductors in a sense opposing the flow of current from said first source to cause said relay to deenergize.

4. An impulsing system as claimed in claim 1 in which the said counter-electromotive force is of higher potential than said source of current.

5. A system such as claimed in claim 2 in which said counter-electromotive force is of twice the potential of said source of current.

6. A system such as claimed in claim 2 having other relays in said line circuit and means for reversing the connections of said source of current to operate them, said last relays nonresponsive to current from said counter-electromotive force.

7. A system such as claimed in claim 3 having an additional relay in said conductors and means for reversing said first source of electromotive force to operate the same, said additional relay having a rectifier in shunt thereof to prevent its operation while said contacts are being operated.

8. In a signaling system, a loop circuit, a relay in series with said loop, a source of current also in series with said loop and said relay, a pair of contacts for opening and closing said loop circuit, a second source of current, and means for introducing said second source in said loop circuit when said contacts are opened to oppose the flow of current from the first source, an earth connection for each source, the conductors of said loop circuit being balanced with respect to earth, another relay in said loop circuit and rectifiers in shunt of the windings of said other relay to cause it to operate on reversal of said first source but to prevent its operation while said contacts are being operated.

9. In a telephone system, a two wire line circuit extending to a remote point, a line relay in series with a source of electromotive force in bridge of said conductors at said point, a pair of contacts at the near end of said circuit and means for opening and closing said contacts to cause impulses of current from said source to traverse said circuit to cause intermittent operation of said relay, a source of counter-electromotive force of higher potential than said remote source, means for connecting said counter-electromotive force to said circuit each time said contacts are opened to aid the rapid decay of current flow from said first source, other relays in said line circuit, and rectifiers in shunt of said other relays to prevent operation thereof by current from said second source.

BERTRAM MORTON HADFIELD.